2,600,063

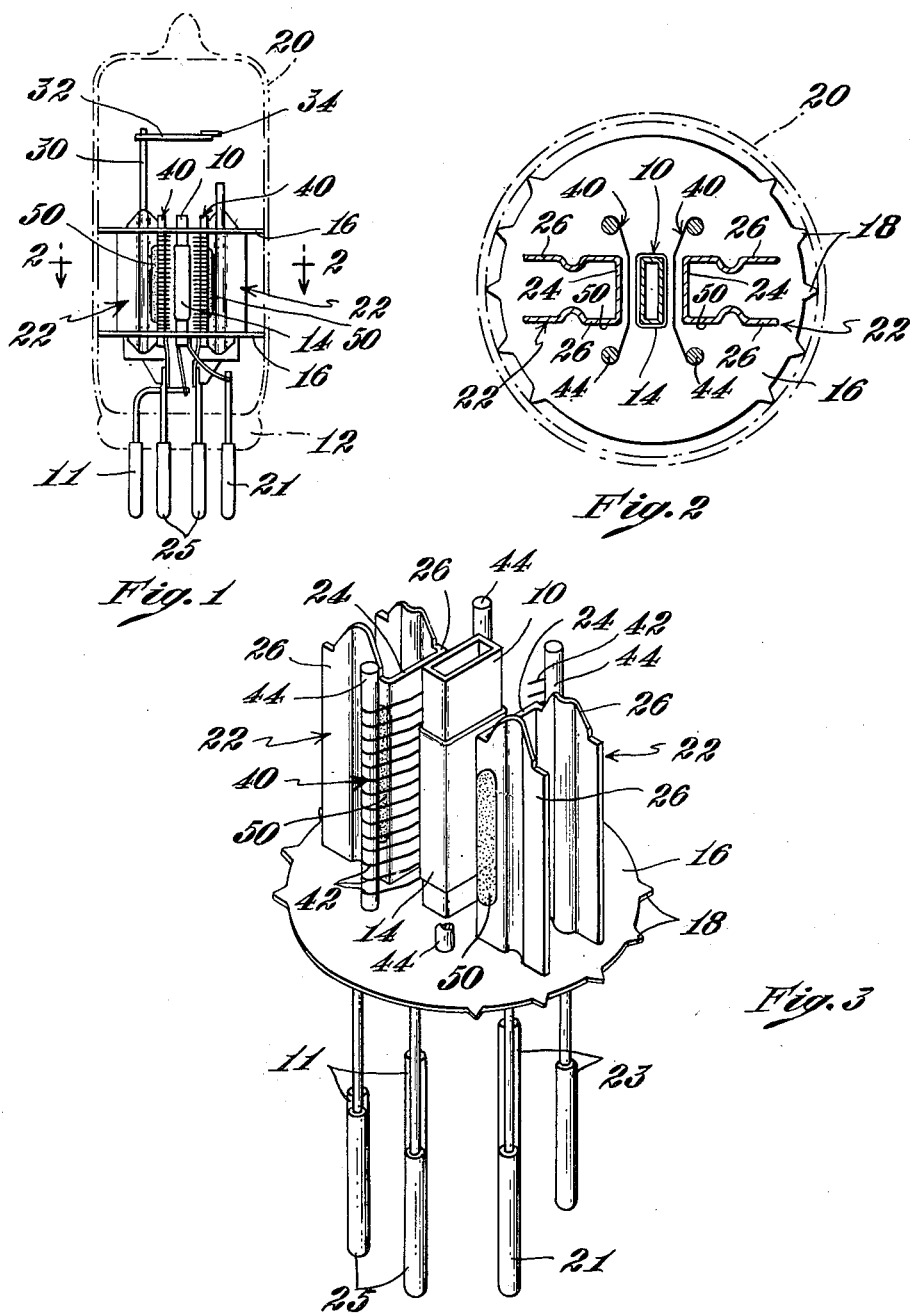
June 10, 1952 — L. S. MALOOF — 2,600,063
VISUAL ELECTRON FLOW INDICATOR
Filed Feb. 20, 1951
Inventor
Leon S. Maloof
by Roberts, Cushman & Grover
Att'ys Patented June 10, 1952

UNITED STATES PATENT OFFICE 2,600,063

VISUAL ELECTRON FLOW INDICATOR

Leon S. Maloof, Watertown, Mass.

Application February 20, 1951, Serial No. 211,904

6 Claims. (Cl. 313—108)

With the tremendous development and increasing complexity of modern radar electronic and communications equipment the problem of quick, efficient service and maintenance becomes an important factor.

The need of some simple, quick and infallible technique or device to facilitate the service and maintenance of all types of electronic equipment is vital.

Accordingly it is the principal object of this invention to provide a means whereby it is possible visually to determine whether a vacuum tube is functioning properly while under normal operating conditions.

Other objects are to provide means for testing vacuum tubes which do not require the use of external equipment such as tube checkers, meters or oscilloscopes; which does not alter the electrical characteristics of the associated circuit of the tube being tested, which can be used in the circuits of existing apparatus without alteration, modification or additions thereto; which does not require that the tube being tested be removed from its socket or the associated equipment be shut down; which gives a continuous indication; which does not require any special skill or techniques to use; which may be readily incorporated in existing types of electron tubes; which does not increase the inter-electrode capacities or alter the normal characteristics of the tube with which it is used; which is safe to use; which is economical to manufacture and which can be produced by mass production techniques.

In a broad aspect the invention contemplates coating or otherwise applying to a selected area of one of the positively charged electrodes of a vacuum tube, for example the anode or the screen grid, a phosphor such as "Willimite," zinc phosphate, zinc sulphide with nickel or any other material which glows or fluoresces under the influence of a beam of electrons. The phosphor-coated area of the electrode is chosen so that it is in the path of the operational flow of electrons from the emitting electrode or cathode to the positively charged electrode and at the same time is visible through the transparent envelope enclosing the tube electrode or in tubes having an opaque envelope visible through a window therein, so that the fluorescence of the phosphor can be observed. The presence of the fluorescing of the spot indicates the presence of the normal operational electron flow, the brilliancy of the fluorescence being a function of the quantity of the electron flow, and with experience a technician can readily determine the normal fluorescing which indicates that the tube and associated circuits are performing normally.

In a more specific aspect an elongated spot or strip of a suitable phosphor is applied to an elongated plane surface of a tube anode which is substantially parallel to the electron emitting tube cathode so that the spot is in the path of such emitted electrons which constitute the normal operational electron flow. In a double triode tube such as the type 6J6 having channel shaped anodes, elongated spots are applied to one or both of the flange portions of each of the anodes of the tube adjacent their junction with the respective web portions where the spots are both visible and in the functional flow of electrons from the tube cathode.

These and other objects and aspects will be apparent from the following description of a specific embodiment of the invention referring to a drawing wherein Fig. 1 is a side elevation view of an electronic discharge device embodying the invention;

Fig. 2 is an enlarged sectional view on line 2—2 of Fig. 1; and

Fig. 3 is an isometric view of the electrodes of the device shown in Fig. 1 with the envelope and other portions broken away.

The electronic discharge device illustrated in Fig. 1 is a double triode vacuum tube having a common cathode 10 and is of generally similar construction to the type of vacuum tube designated 6J6. The cathode 10 is of the conventional coated type enclosing an electrical heater (not shown) which is energized from an external power source through two pins 11 extending downwardly from the tube base 12. When the heater raises the temperature of the cathode 10 to a dull red, its coated surface 14 copiously emits electrons in the well known manner which comprises no part of this invention and need not be described in further detail. The opposite ends of the cathode 10 are supported respectively by two spacers 16 which are generally circular in form and provided with peripherally extending tabs 18 for bearing against the inside of an enclosing glass envelope 20.

The spacers 16 also support two anodes 22, one of which is positioned on either side of the cathode 10 in parallel relationship thereto. Each of the anodes 22 is generally channel-shaped in cross section consisting of a web portion 24 which is positioned adjacent the cathode 10 and two flange portions 26 integrally formed with and bent back normally to the web portion so that the flange portions extend outwardly away from the cathode. Attached to the upper end of one of the anodes 22 is a rod 30 (Fig. 1) at whose upper end is a horizontal member 32 carrying a pan 34 for the "getter" used to exhaust the tube.

Connections from the cathode 10 and anodes 22 to external circuits are made through pins extending from the base, pin 21 being connected internally to the cathode and pins 23 with the respective anodes. When the negative and positive terminals of a conventional source applying a direct potential, such as a battery or rectifier, are connected respectively to the pin 21 and either of the pins 23, the potential difference is applied between the heated cathode surface 14 and the anode 22 which causes the electrons emitted by the cathode to flow to the anode. The flow of such electrons is controlled by an electrode 40 consisting of a plurality of parallel conductors such as the small wires 42 which extend between two mounting supports such as the post 44 located upon either side of an associated anode 22 so that the wires are in the path of the flow of electrons. A similar control electrode is interposed between the cathode 10 and the other anode 22. The respective control electrodes 40 are connected internally with pins 25 so that the potential of either control electrode with respect to the cathode 10 can be varied thereby to control the number of electrons flowing to the correlated anode 22.

The presence of the above described electron flow is visually indicated by the fluorescing of two elongated spots of a phosphor such as "Willimite" one of which is applied to a surface of each of the respective anodes which is in the path of the electrons. Although in some types of tubes wherein the spacing between the cathodes and the anode is greater, it is possible to apply the spot of phosphor to the anode surface directly opposed to the emitting surface of the cathode, it has been found in tubes of the type described above wherein the electrode spacing is minimized that the heat from cathode causes the phosphor to boil or flake off. It is therefor preferable to apply the spot of phosphor to the anode flanged portion 26 where the spot is shielded from direct heat radiation from the cathode. Although the entire outer surface of both of the flanged portions 26 have been found to receive sufficient flow of electrons from the emitting surface 14 of the cathode to cause the phosphor to fluoresce, the effect is greater nearer the cathode so that it is preferable to locate the phosphor spot on the flanged portion 26 of the anode as at 50 (Fig. 3) adjacent the junction with the web portion 24 of the anode 22. Although I have shown a phosphor spot 50 on only one flange portion 26 of each anode 22, it is to be understood that it is within the scope of this invention to apply spots to both flange portions of each anode so that the electron flow can be checked from either side of the tube.

As the presence of the phosphor spots 50 has been found in no way to effect the performance or characteristics of the tube, it can be used as a replacement for its conventional prototype without any change in the associate circuit. When the tube is operating normally the phosphor spots 50 fluoresce brilliantly enough so that they can be seen at a distance of several feet in illumination of ordinary intensity so that by observing that the fluorescence is of normal brilliancy a technician can visually determine without the need of any test instrument or tube checker that the following conditions prevail:

(1) The emission of the cathode is sufficient.
(2) The power supply impressing voltage upon the anode is operating satisfactory.
(3) The tube is conducting i. e. the presence of plate current.
(4) Present and relative strength of modulated input carrier signals.

It is thus possible in apparatus such as computors where large numbers of similar tubes are used, quickly to find faulty tubes by observation of the relative brilliancy of the respective phosphor spots in adjacent tubes thus greatly reducing the time required to isolate the tube or circuit wherein the fault is located. The possibility of visual checking the tubes also reduces the chance of obtaining incorrect results due to an undetected failure of some portion of the computor and thus permits the elimination of expensive and complicated auxiliary checking circuits, thereby minimizing the cost of construction.

Tubes incorporating the above described phosphor spots also have application in less complex circuits such as in communication and radar equipment used by the armed forces, airlines and railroads, the continuous functioning of which is a vital matter. In such equipment the technician can determine by the reduction in the brilliancy of the fluorescence of the phosphor spots the tubes in which the emission is reduced without removing the tubes from their sockets thus reducing the maintenance time required for routine checks and eliminating to a great extent the necessity for periodic replacement of all tubes.

Although I have found that for general applications the brilliant green fluorescence of "Willimite" is the most satisfactory color, for special purposes other phosphors having different fluorescing colors can be used to advantage. For example by the use of different phosphors upon the respective anodes 22, it is possible to determine when the tube is used in a "flip-flop" circuit which half of the tube is conducting. It is also possible to use different phosphors in tubes of the same or other types which are used for different purposes making it possible, for example, for a technician to determine visually the tubes in the high, intermediate and audio frequency stages or having special functions.

It should be understood that the present disclosure is for the purpose of illustration only and that this invention includes all modifications and equivalents which fall within the scope of the appended claims.

I claim:

1. An electron discharge device of the type having a transparent enclosing envelope, a cathode having a heated surface for emitting electrons, an anode having a surface substantially parallel to the cathode and spaced at a distance therefrom, means connecting the cathode and the anode to the negative and positive terminals respectively of a direct potential source thereby to cause a flow of electrons between the surfaces, a control electrode having a plurality of conductors interposed between the surfaces transversely to the direction of the flow of electrons, and a spot of a phosphor on the anode, said spot being visible externally the envelope, said spot being located in the path of the fringe flow of the electrons through the control electrode and shielded from the heat of said cathode.

2. An electron discharge device of the type having a transparent enclosing envelope, a cathode having a heated surface for emitting electrons, an anode having an elongated plane surface substantially parallel to the cathode and spaced at a distance therefrom, means connecting the cathode and the anode to the negative and positive terminals respectively of a direct potential source thereby to cause a flow of electrons between the surfaces, a control electrode having a plurality of conductors interposed between the surfaces transversely to the direction of the flow of electrons, and a spot of a phosphor on the elongated plane surface of the anode, said spot being visible externally the envelope, said spot being located in the path of the fringe flow of the electrons through the control electrode and shielded from the heat of the cathode.

3. An electron discharge device of the type having a transparent enclosing envelope, a cathode having a heated surface for emitting electrons, an anode having at least two elongated plane surfaces substantially parallel to the cathode and spaced at a distance therefrom, the first of said surfaces facing said cathode, the second surface being substantially normally disposed to the first surface, means connecting the cathode and the anode to the negative and positive terminals respectively of a direct potential source thereby to cause a flow of electrons between the surfaces, a control electrode having a plurality of conductors interposed between the surfaces transversely to the direction of the flow of electrons, and a spot of a phosphor applied to the second plane surface of the anode, said spot being visible externally the envelope, said spot being located in the path of the fringe flow of the electrons through the control electrode and shielded from the heat of said cathode.

4. An electron discharge device of the type having a transparent enclosing envelope, a heated cathode having a surface for emitting electrons, an anode spaced at a distance from cathode, said anode being in the form of a channel with its web portion parallel to a portion of the emitting surface of the cathode and its flanged portions extending away therefrom, means connecting the cathode and anode to the negative and positive terminals respectively of a direct potential source thereby to cause a flow of electrons between the cathode and the anode surface, an elongated spot of a phosphor applied to one of the flanged portions adjacent its junction with the web portion of the anode, said spot being visible externally of the tube, said spot being located in the path of the fringe flow of electrons from said cathode to said anode and shielded from the heat of said cathode.

5. A vacuum tube comprising an electron emitting cathode, an anode having a surface parallel to the cathode, and a spot of phosphor material on the anode, said spot being visible externally of the tube, said spot being located in the path of the fringe flow of electrons from said cathode to said anode and shielded from the heat of said cathode.

6. A vacuum tube comprising an electron emitting cathode and a channel shaped anode having its web portion parallel to said cathode and its flanged portions extending away therefrom, and a spot of phosphor material applied to the outer surface of one of the flanged portions of the anode adjacent the junction with the web portion, said spot being visible externally of the tube, said spot being located in the path of the fringe flow of electrons from said cathode to said anode and shielded from the heat of said cathode.

LEON S. MALOOF.

REFERENCES CITED

The following references are of record in the file of this patent:

UNITED STATES PATENTS

| Number | Name | Date |
|---|---|---|
| 1,994,726 | Orth | Mar. 19, 1935 |
| 2,113,669 | Thompson | Apr. 12, 1938 |
| 2,130,162 | Thompson | Sept. 13, 1938 |
| 2,175,690 | Happe, Jr. | Oct. 10, 1939 |
| 2,175,700 | Roberts | Oct. 10, 1939 |
| 2,197,341 | Jonker | Apr. 16, 1940 |
| 2,223,285 | Heins | Nov. 26, 1940 |
| 2,243,034 | Heins | May 20, 1941 |
| 2,273,800 | Jensen | Feb. 17, 1942 |
| 2,394,857 | Hultquist | Feb. 12, 1946 |
| 2,564,737 | Szegho | Aug. 21, 1951 |
| 2,565,533 | Szegho | Aug. 28, 1951 |